(12) United States Patent
Andrews

(10) Patent No.: US 6,744,575 B1
(45) Date of Patent: Jun. 1, 2004

(54) OPTICAL MOUNT AND METHOD FOR USE THEREOF

(75) Inventor: Martin D. Andrews, Menlo Park, CA (US)

(73) Assignee: Axon Instruments, Inc., Union City, CA (US)

( * ) Notice: Subject to any disclaimer, the term of this patent is extended or adjusted under 35 U.S.C. 154(b) by 47 days.

(21) Appl. No.: 10/293,790

(22) Filed: Nov. 12, 2002

(51) Int. Cl.$^7$ ................................................ G02B 7/02
(52) U.S. Cl. ...................... 359/819; 359/822; 359/829
(58) Field of Search .................. 359/811, 819, 359/822, 829

(56) References Cited

U.S. PATENT DOCUMENTS

| | | | |
|---|---|---|---|
| 2,266,169 A | * | 12/1941 | Crumrine .................... 249/95 |
| 4,147,405 A | * | 4/1979 | Spainhour .................... 385/60 |
| 4,183,627 A | * | 1/1980 | Camerik .................... 359/822 |
| 4,966,474 A | | 10/1990 | Geiger |
| 5,140,470 A | | 8/1992 | Luecke |
| 5,183,350 A | | 2/1993 | Kramer |
| 5,530,547 A | | 6/1996 | Arnold |
| 5,757,561 A | | 5/1998 | Sechrist et al. |
| 6,016,230 A | | 1/2000 | Nunnally et al. |
| 6,061,190 A | | 5/2000 | Kane et al. |
| 6,163,417 A | | 12/2000 | Nunnally |
| 6,198,580 B1 | | 3/2001 | Dallakian |
| 6,304,393 B1 | | 10/2001 | Sechrist et al. |
| 6,438,461 B1 | | 8/2002 | Desailly et al. |
| 6,590,723 B1 | * | 7/2003 | Hodge ........................ 359/822 |
| 2003/0152332 A1 | * | 8/2003 | Kao ............................ 385/78 |

* cited by examiner

*Primary Examiner*—Ricky Mack
(74) *Attorney, Agent, or Firm*—Dorsey & Whitney LLP (57) ABSTRACT

An optical mount, including a first plate, a second plate, an adjustment screw, and a locking screw. The second plate may include an adjustment bore having an adjustment bore thread and a list separating a second plate flange from a second plate body and extends into the adjustment bore. The adjustment screw may engage the first plate for adjusting relative position of the first plate in relation to second plate. The locking screw may engage the second pate flange and the second plate body to press at least a portion of the adjustment bore thread into the adjustment screw thread for securing the adjustment screw. An attachment bore may be included for receiving an attachment. A method for using the optical mount is also disclosed.

27 Claims, 8 Drawing Sheets

OPTICAL MOUNT AND METHOD FOR USE THEREOF

BACKGROUND OF THE INVENTION

1. Field of the Invention

This invention relates, in general, to an optical mount and to a method for use thereof In particular, the present invention relates to an integrated keyed locking mechanism for optical components.

2. Description of Related Art

The working surface of an optical component essentially defines how the component will be positioned and/or oriented within an optical system. Most kinematic mounts provide indirect reference to an optical component's working surface. For example, changes in thickness, flatness, and other dimensions and/or features of the optic may shift the position of the working surface of the optical component with respect to the reference surface of the mount. To accommodate such changes and/or tolerances, some prior optical mounts provide a means of securing an optical component in place after adjustments are made are known.

An exemplar of such prior optical mounts is U.S. Pat. No. 6,016,230 to Nunnally et al. which shows an optical mount with a locking adjustment screw. Unfortunately, such prior optical mounts may be prone to breakage. As shown in FIG. 8 of the Nunnally patent, a plate flange 106 is bent to create a locking force that prevents movement between drive screw 114 and second plate 104. During normal usage, pushing the plate may fatigue the plate flange and cause the plate flange to break and/or bend. Further, the design does not limit movement of the plate flange and thereby increases the likelihood of breakage and/or bending due to excessive movement of the plate flange. If the plate flange is broken and/or bent then the optical mount may require repair or replacement. Consequently, the optical mount may be easily damaged. Furthermore, such prior optical mounts often include bushings or collets, a configuration that requires additional parts and, in many instances, prevents direct thread-to-thread contact between adjusting screws and the mount plates which position an optical component.

What is needed is an optical mount and method for use thereof which overcomes the above and other disadvantages of known optical mounts.

BRIEF SUMMARY OF THE INVENTION

In summary, one aspect of the present invention is directed to an optical mount, including a first plate, a second plate, an adjustment screw, and a locking screw. The second plate includes an adjustment bore having an adjustment bore thread and a slit separating a second plate flange from a second plate body and extends into the adjustment bore. The adjustment screw has an adjustment screw thread, with the adjustment screw extending through the adjustment bore and engaging the first plate for adjusting relative position of the first plate in relation to the second plate. The locking screw engages the second plate flange and the second plate body for biasing the second plate flange toward the second plate body to press at least a portion of the adjustment bore thread into the adjustment screw thread for frictionally securing the adjustment screw. The optical mount may include an attachment bore for receiving an attachment.

Another aspect of the present invention is directed to an optical mount, capable of receiving an attachment. The first plate includes an attachment bore having an attachment bore axis with a first plate flange extending inward toward the attachment bore axis. The first plate also includes a channel through the first plate flange and a portion of the first plate. The attachment includes a protrusion with a protrusion axis and an attachment flange extending outward away from the protrusion axis. The protrusion may be slidably inserted through the channel into the attachment bore. The protrusion may be rotatably coupled with the attachment flange and the first plate flange. An attachment locking system may releasably couple the attachment and the first plate.

The optical mount and method for use thereof of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
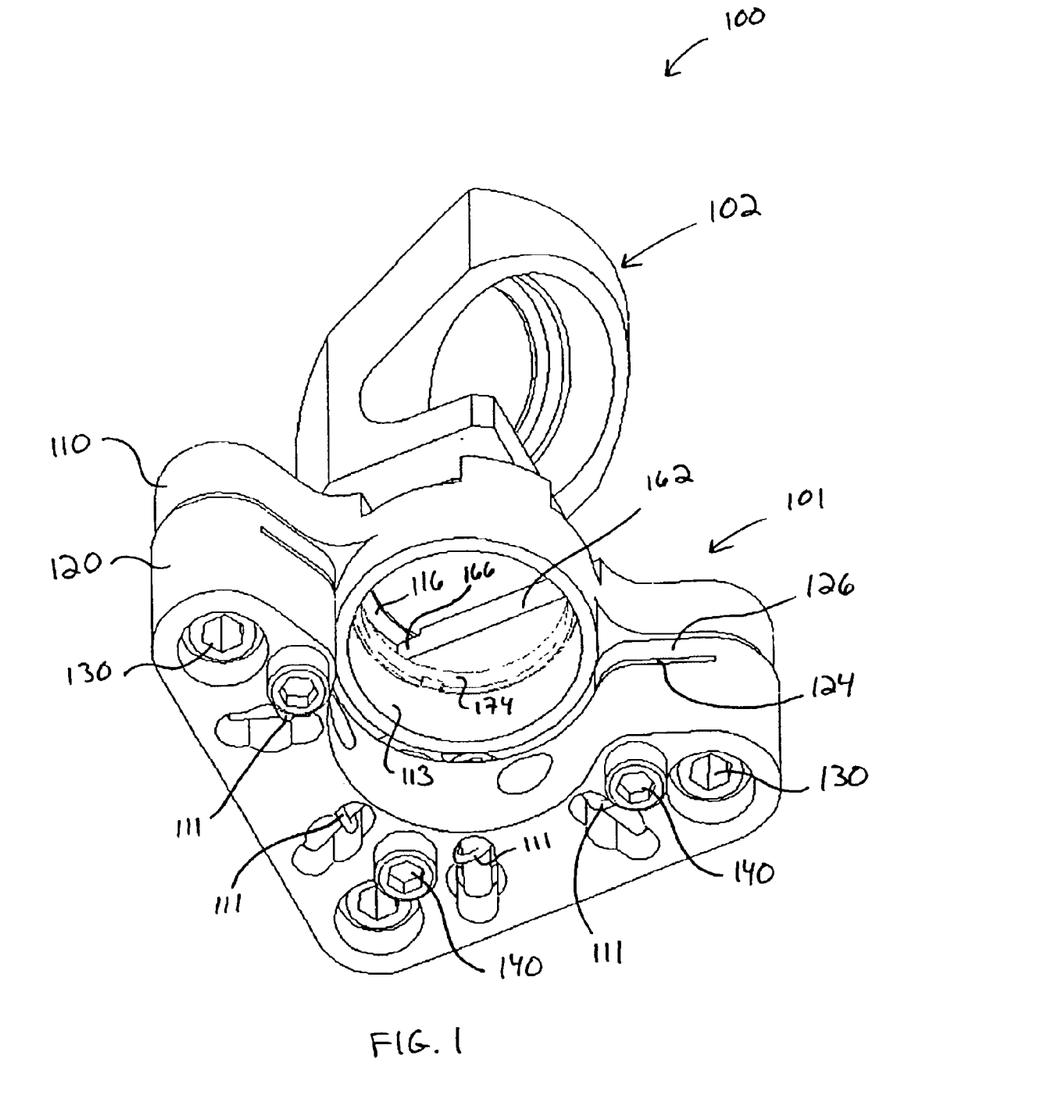
FIG. 1 is a perspective view of an optical mount having a base and an attachment, in accordance with the present invention.

Turning now to the drawings, wherein like components are designated by like reference numerals throughout the various figures, attention is directed to FIG. 1, where an optical mount 100 is illustrated. The optical mount generally includes a base 101 and an optical attachment 102.

Base 101 generally includes an "L" shaped first or carriage plate 110, and an "L" shaped second or base plate 120 which provide appropriate surfaces and reference features for mounting a fully assembled optical component into a system. Base 101 includes several threaded bores which receive three fine-pitch adjustment screws 130 for precisely adjusting the spacial and planer relationship of first plate 110 with respect to second plate 120. In the illustrated embodiment, adjustment screws have a ball nose which engages first plate 110, however, one should appreciate that other configurations may be used. Furthermore, one should also appreciate that the shape of the base and/or the number of adjustment screws may vary in accordance with the present invention.

A locking mechanism is incorporated into the base that is capable of locking down the adjustment screws. Base 101 includes three locking screws 140 for securing the adjustment screws 130 once the adjustment screws have been properly adjusted. In the illustrated embodiment, a locking screw is provided for each adjustment screw, however, one should appreciate that each locking screw may be configured to secure two or more adjustment screws or that two or more locking screws may be configured to secure each adjustment screw. Each locking screw 140 may include a socket head cap screw or other suitable screw. In the illustrated embodiment, locking screws 140 are fitted into base plate 110 opposite the ball nose of adjusting screws 140 thus allowing ready access for tightening the locking screws when base 101 is fully assembled.

Four biasing members in the form of tension springs 111 engage the first plate 110 and the second plate 120 for biasing the first carriage plate 110 toward the second base plate 120 such that the carriage plate is seated on the base plate as shown in FIG. 1. In the illustrated embodiment, a pin is utilized to anchor a respective end of each tension spring in place, wherein each pin is received in a respective pin recess. One should appreciate that one, two, three or more tension springs can be used. One should also appreciate that other suitable biasing members and respective anchoring means may be used in accordance with the present invention.

Figure 3:
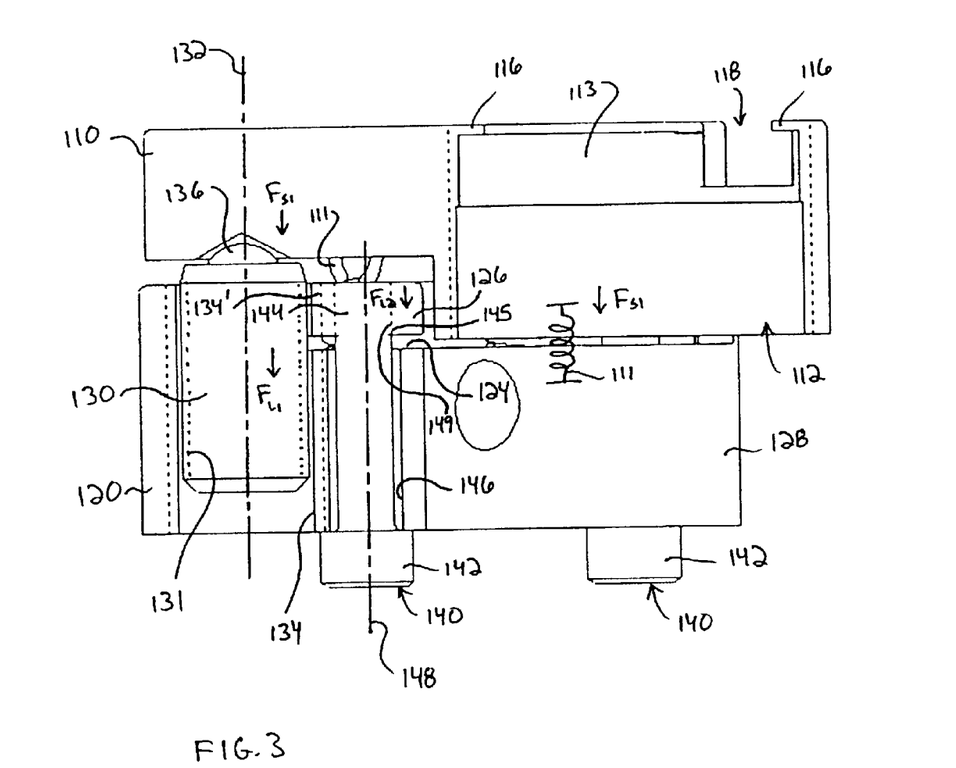
FIG. 3 is a cross-sectional view of the optical mount of FIG. 1 taken along line 3—3 of FIG. 2.

The second plate 120 includes a slit 124 that separates a flexure or second plate flange 126 from a second plate body 128, as most clearly shown in FIG. 3. Slit 124 extends into an adjustment bore 122. The adjustment screw 130 adjusts the relative position of the first plate in relation to the second plate. Locking screw 140 biases the second plate flange 126 toward the second plate body 128 to frictionally secure the adjustment screw 130 with respect to second plate 120.

In the illustrated embodiment, the locking screw 140 is configured to screw into the second plate flange 126 in a direction that is substantially perpendicular to the slit 124 parallel to adjustment screw 130. One should appreciate, however, that the locking screw need not be perpendicular to the slit and/or parallel to the adjustment screw.

Figure 2:
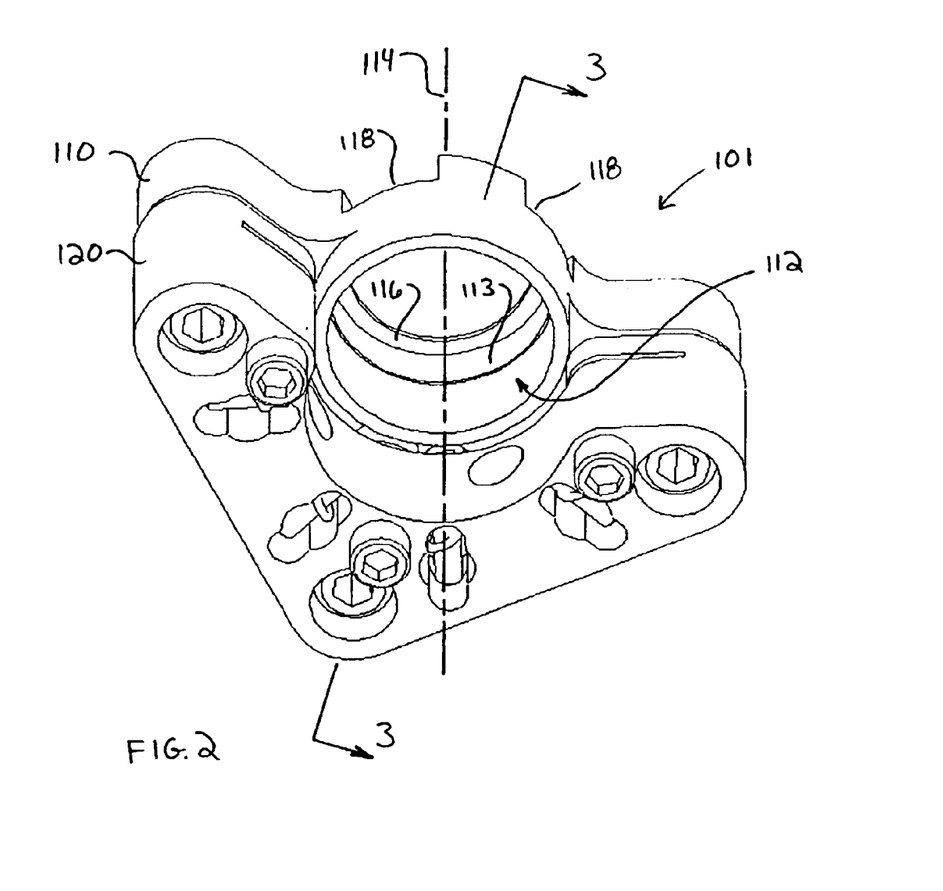
FIG. 2 is a perspective view of the optical mount of FIG. 1 with the attachment removed.

As shown in FIG. 2, the base 101 includes a wall 113 defining an attachment bore 112 with a longitudinal bore axis 114, a first plate flange 116, and a pair of channels 118. The attachment bore 112 passes through the first plate. As illustrated the first plate 110 includes an inner wall surface 113 defining a portion of the attachment bore 112 for receiving an attachment flange 166. The first plate flange 116 extends inward from an inner surface of wall 113 toward the longitudinal bore axis 114. Each channel 118 passes through the first plate flange 116 and a portion of the first plate 110, namely, a portion of wall 113.

As illustrated, the base 101 includes two channels 118 through the first plate flange 116 and a portion of the first plate 110. One should appreciate that one or more channels may be utilized in accordance with the present invention. Attachment 102 includes two mating protrusions that are slidably insertable into the two channels, respectively. Advantageously, one or more channels 118 may be adapted to receive a respective mating protrusion.

As shown in FIG. 3, the second plate 120 includes adjustment bore 122 and is adjustably assembled with first plate 110 using the adjustment screws 130, the, locking screws 140, and the springs 111. The adjustment bore 122 has an adjustment bore thread 134, and the adjustment screw 130 has a complementary adjustment screw thread 131.

The adjustment screw 130 extends through the adjustment bore 122 for adjusting the relative position of the first plate 110 in relation to the second plate 120. Adjustment screw thread 131 cooperates with adjustment bore thread 134 such that rotation of the adjustment screw 130 in one direction, for example, a clockwise direction advances the adjustment screw upwardly to push the first plate 110 away from the second plate 120. Springs 111 bias the first plate 110 downwardly toward the second plate 120 such that springs 111 pull the first plate 110 downwardly toward the second plate 120 as adjustment screw 130 is rotated in an opposite direction, for example, a counterclockwise direction. One should appreciate that other suitable means may be utilized to adjust the relative position of the first and second plates in accordance with the present invention.

In the embodiment shown in FIG. 3, adjustment screw 130 is of the type that includes a ball bearing 136 set in an upper end of adjustment screw 130. Ball bearing 136 provides the point of contact between adjustment screw 130 and first plate 110.

The locking screw is configured for biasing the second plate flange 126 toward the second plate body 128 to press at least a portion, for example 134', of the adjustment bore thread 134 into the adjustment screw thread 131 for frictionally securing the adjustment screw 130 with respect to second plate 120. The locking screw 140 may engage the second plate flange 126 and/or the second plate body 128. The locking screw 140 may be actuated to bias the second plate flange 126 toward the second plate body 128 and to lock the adjustment screw 130.

With reference to FIG. 3, actuation of the locking screw 140 may create a first locking force $F_{L1}$, on the adjustment screw 130 that is in the same direction as the spring force $F_{S1}$. Accordingly, actuation of the locking screw 140 does not create a corresponding shift between the adjustment screw thread 131 and the adjustment bore thread 134 located on the second plate body 128; One should appreciate that other suitable means may be utilized to bias the second plate flange 126 toward the second plate body 128 in accordance with the present invention.

According to one embodiment of the present invention, actuation of the locking screw 140 creates a second locking force $F_{L2}$ that is also the same direction as the spring force $F_{S1}$. Actuation of the locking screw 140 may create a corresponding shift between the adjustment screw thread 131 and the adjustment bore thread 134' in proximity to the flange 126. Actuation of the locking screw 140 may increase the force effected against the adjustment screw by the $F_{S1}$ such that actuation of the locking screw 140 does not create a corresponding shift between the adjustment screw thread 131 and the adjustment bore thread 134 located on the base 128. Advantageously, actuation of the locking screw 140 effects a second locking force $F_{L2}$ in the same direction as the spring force $F_{S1}$.

Locking screw 140 is configured for biasing the second plate flange 126 toward the second plate body 128 to effect a first locking force $F_{L1}$, on the adjustment screw against the second plate body 128 that is in the same direction as a spring force $F_{S1}$, effected by the spring 111 on the adjustment screw 130 against the plate second base 128.

Locking screw 140 includes a head 142 and a tip 144. The tip 144 is configured to pass through-an unthreaded locking bore 146 to extend through the second plate body 128, pass across the slit 124, and engage the second plate flange 126 via locking threads 149. The head 142 is configured to engage the second plate body 128. In the illustrated embodiment, head 142 abuts against an outer surface of second plate body 128, however, the head may be countersunk within the second base plate. According to one embodiment of the present invention, the locking screw bore includes a portion which extends through second plate flange 126 and has a locking flange thread 149. Tip 144 includes a locking screw thread 145 to mate with the locking flange thread 149 for adjusting the relative position of the second plate body 128 and the second plate flange 126.

Rotating the locking screw 140 in one direction biases the second plate flange 126 toward the base 128. The second plate flange 126 deflection toward the base 128 creates the first locking force $F_{L1}$, that prevents rotation of the adjustment screw 130 within the adjustment bore 122 due to frictional engagement of bore thread 134' against adjustment screw thread 131, thus preventing movement along the longitudinal axis 132.

The first locking force $F_{L1}$, is in the same direction as the spring force $F_{S1}$. Accordingly, when the locking screw is sufficiently tightened and locked in place there is substantially no relative movement between the adjustment screw thread 131 and the adjustment bore thread 134 because the spring force $F_{S1}$, already biased adjustment screw thread 131 of adjustment screw 130 downwardly against the upper surface of bore thread 134. Thus the present invention provides a locking mechanism that minimizes and/or prevents relative movement between the adjustment screw thread 131 and the adjustment bore thread 134 as the locking screw 140 is tightened.

In the illustrated embodiment, slit 124 extends into the adjustment bore 122 in order to allow second plate flange 126 to flex with respect to second plate body 128. In one embodiment, slit 124 extends approximately 180° or more about a longitudinal axis 132 of the adjustment bore 122, that is, approximately half-way across the adjustment bore. One should appreciate that the slit need not extend into the adjustment bore but may instead extend proximal to the adjustment bore. Alternatively, the slit may extend completely through the adjustment bore. Preferably, slit 124 extends across adjustment bore 122 a distance that is approximately 20% to 80% of the diameter of adjustment bore 122.

Movement of the second plate flange 126 is limited by the width of the slit 124 and/or the shape of the flange and/or base in proximity to the slit 124. Advantageously, the present invention restricts the movement of the second plate flange 126. Consequently, the propensity for bending and/or breaking the second plate flange is reduced. One should appreciate that other suitable widths, shapes, and/or sizes of the slit 124 may be utilized to limit movement of the second plate flange 126 in accordance with the present invention.

Figures 4, 5:
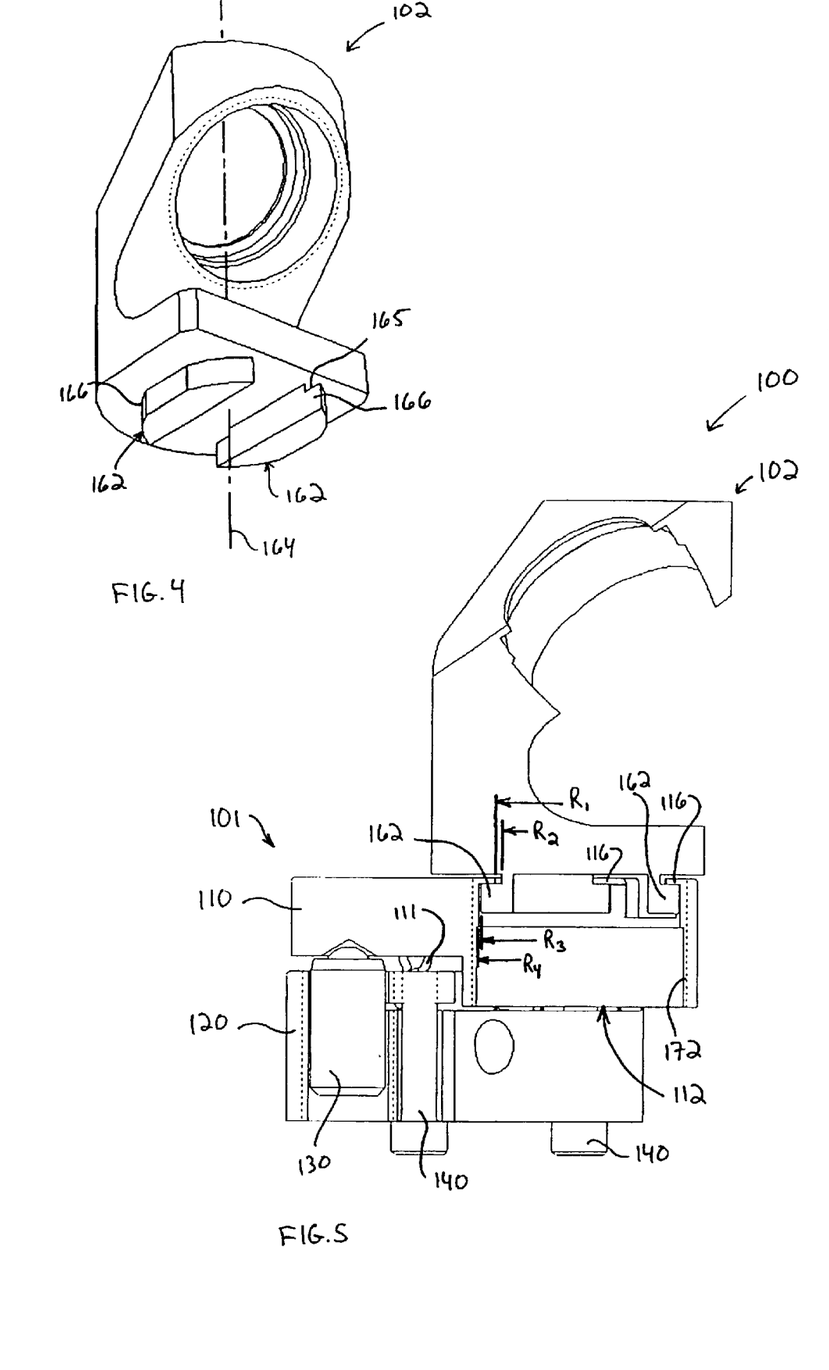
FIG. 4 is a perspective view of the attachment shown in FIG. 1.
FIG. 5 is a cross-sectional view, similar to FIG. 3, of the optical mount of FIG. 1 shown with the attachment in place.

Optical mount 100 also includes a coupling mechanism for releasably coupling attachment 102 to base 101. As shown in FIG. 4, an attachment 102 includes a protrusion 162 which forms a right angled "A" frame or key that can be inserted into a corresponding keyway which is formed by channels 118 of first plate 110 in the manner shown in FIG. 5.

As shown in FIG. 4, attachment 102 includes an attachment flange 166 extending outwardly away from an attachment axis 164 thus forming an attachment groove 165. The protrusion is configured for slidably insertion through a pair of channels 118 and into the attachment bore 112. The attachment flange 166 may be configured for mating with the inner wall surface 113 of the attachment bore 112.

One should appreciate that other suitable means may be utilized to configure the protrusion for slidable insertion through one or more respective channels, in accordance with the present invention. The attachment may include a plurality of protrusions that may be configured for slidable insertion through one or more channels. Each protrusion may be configured for slidably insertion through a respective channel.

As shown in FIG. 5, attachment 102 can be precisely positioned and secured with respect to base 101. The protrusions are configured for rotatably coupling attachment 102 to base 101 such that attachment flanges 166 may rotate within inner wall surface 113 of the base. Upward axial motion of attachment flanges 166 is limited by first plate flange 116. The attachment locking system 170 is configured for releasably coupling the attachment 102 and the first plate 10 and, releasably securing attachment flanges against first plate flange 116.

As shown in FIG. 5, the first plate flange 116 includes a minimum inner first radius $R_1$. Attachment groove 165 has a second maximum outer radius $R_2$. The first radius $R_1$ is greater than the second radius $R_2$. The attachment flange 166 has a third maximum outer radius $R_3$. The third radius $R_3$ is greater than the first radius $R_1$ thereby limiting axial motion of attachment 102 upward from base 101. The inner wall surface 113 has a fourth minimum inner radius $R_4$ that is greater than the third radius $R_3$. The configuration of the outer and inner radii allow attachment 102 to rotate within the inner wall surface 13 of base 111 while preventing upward motion of the attachment with respect to the base.

Figure 8:
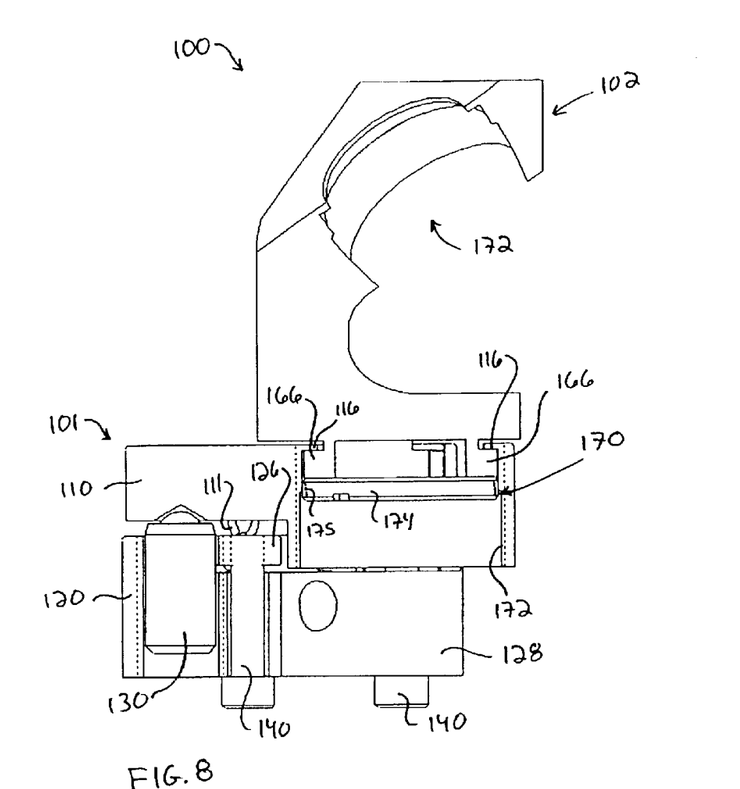
FIG. 8 is a cross-sectional view of the optical mount of FIG. 1 illustrating the attachment secured to the base.

With reference to FIG. 8, an attachment locking system 170 is provided to not only releasably secure attachment 102 to base 101 but to also precisely and repeatably position the attachment with respect to the base. According to one embodiment of the present invention, the attachment locking system 170 includes an attachment bore thread 172, and an attachment locking member 174 having a locking member thread 175 to mate with the attachment bore thread 172. Attachment locking member 174 is configured for pushing the attachment flange 166 toward the first plate flange 116 for frictionally securing the attachment flange 166 to the first plate flange 116 thereby locking the attachment 102 to the first plate 110.

Figure 6:
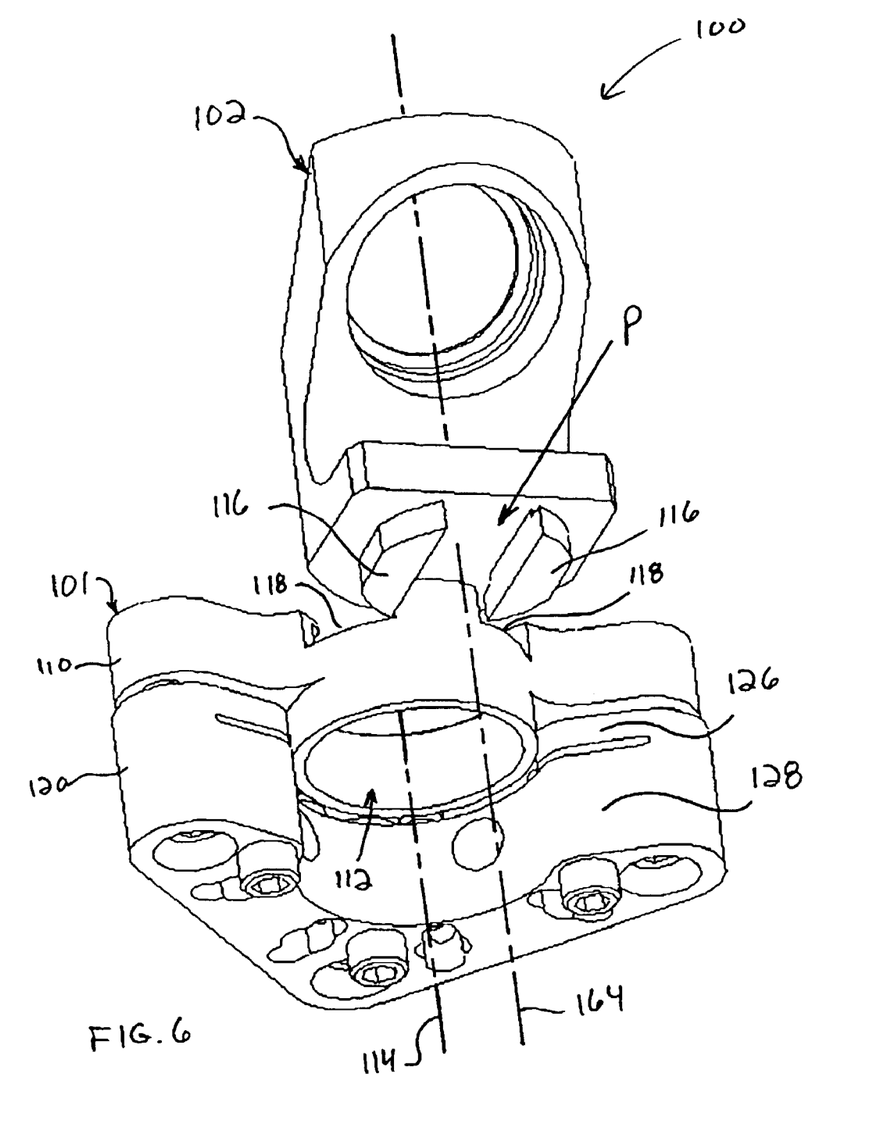
FIG. 6 is a perspective view of the optical mount of FIG. 1 illustrating the insertion of the attachment into the base.

In operation and use, the attachment 102 is slidably engaged with the first plate 110 using a slidable insertion path P, as illustrated in FIG. 6. The pair of protrusions 162 in alignment with the pair of channels 118 slidably engage the first plate 110. The pair of protrusions 162 are inserted through the pair of channels 118 and into the attachment bore 112 of the first plate 110. The slidable engagement is accomplished by moving the protrusion 162 through the channel 118 in a direction that is non-parallel to the longitudinal bore axis 114. Slidably engaging the attachment 102 with the first plate 110 results in the coincidentally alignment of the longitudinal bore axis 114 and attachment axis 164.

In the illustrated embodiment, protrusions 162 are diametrically opposed with respect to attachment axis 164. One should appreciate, however, that the projections may be offset, provided that the channels are similarly offset.

Slidably engagement may be accomplished by moving the protrusion 162 through the channel 118 in a direction that is substantially perpendicular to the longitudinal bore axis 114. One should appreciate that other suitable means may be utilized for slidably engagement of one or more protrusions 162 through one or more channels 118.

Figure 7:
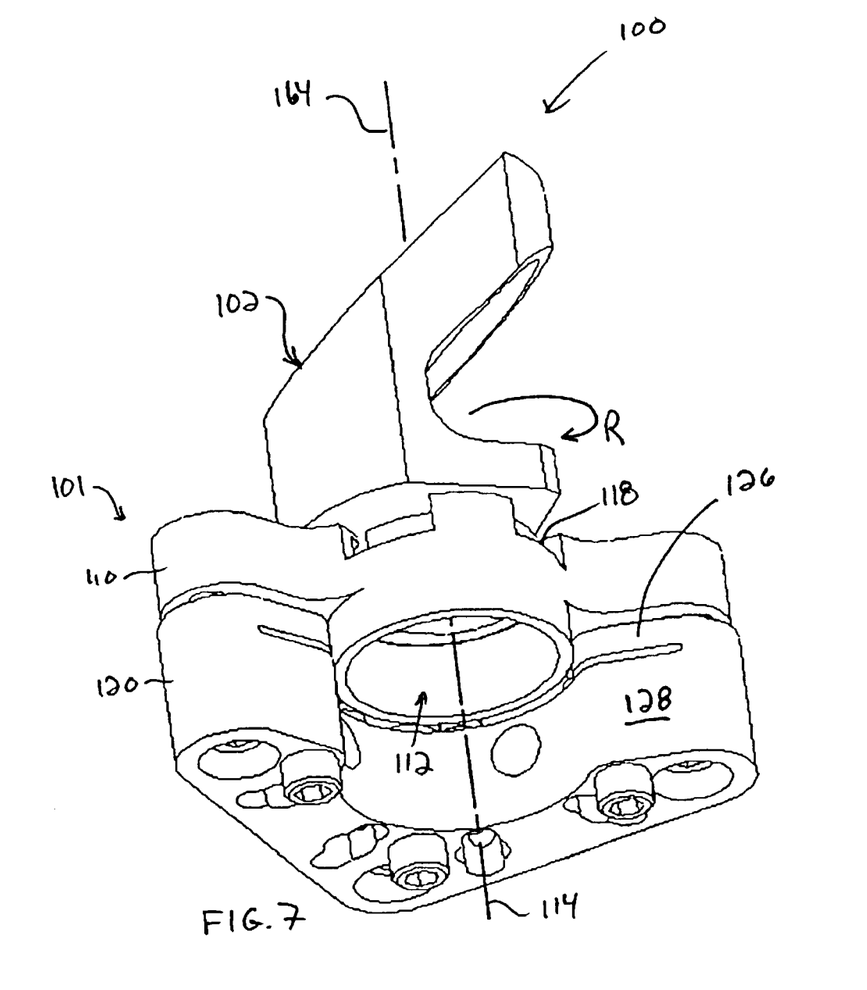
FIG. 7 is a perspective view of the optical mount of FIG. 1 illustrating rotation of the attachment with respect to the base.

As illustrated in FIG. 7, the attachment 102 is rotated in the direction indicated by arrow R with respect to the first plate 10 about the coincidentally aligned longitudinal bore axis 114 and attachment axis 164. A rotation R that moves one or more protrusions 162 out of alignment with one or more respective channels 118 secures the protrusions within attachment bore 112 thereby coupling attachment 102 with first plate 110. A rotation R that moves one or more protrusions 162 in alignment with one or, more respective channels 118 allows a slidable disengagement of attachment 102 with first plate 110.

As illustrated in FIG. 8, the attachment 102 is releasably secured to the first plate 110 using attachment locking system 170, as described above. According to one embodiment, the attachment locking system 170 includes tightening a locking ring 174 to bias the attachment flange 166 toward the first plate flange 116 for frictionally securing the flanges. Rotation of the locking ring 174 in one direction biases the attachment flange 166 toward the first plate flange 116 securing the flanges. Rotation of the locking screw in the opposite direction releases the biases of the attachment flange 166 toward the first plate flange 116 to unsecure the flanges.

Removing the attachment 102 from the first plate 110 may be performed by releasing the attachment locking system 170, rotating the attachment 102 to align one or more protrusion 162 with one or more channel 118, and sliding the attachment 102 away from the first plate 110 in an opposite direction of the slidable insertion path P.

Figure 9:
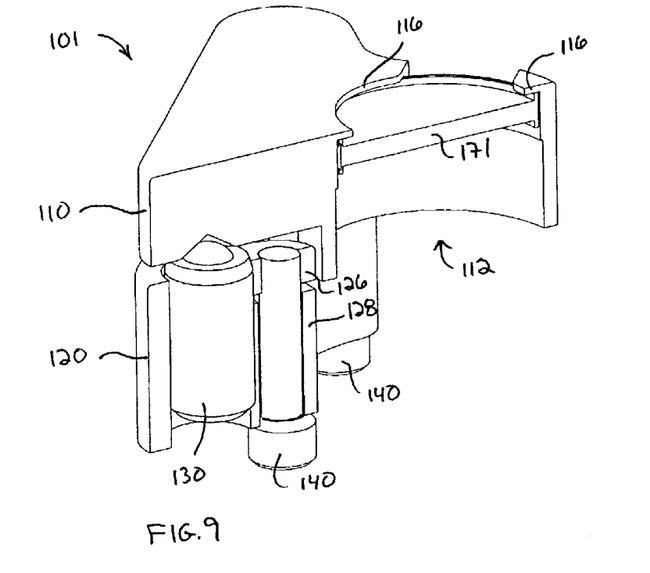
FIG. 9 is a cross-sectional perspective view of the optical mount of FIG. 1 with the attachment replaced by an optical component.

As shown in FIG. 9, attachment 102 may be removed from base 101 and an optical component 171 may be mounted directly to base 101. In particular, attachment bore 112 is dimensioned and configured to receive optical component 171. In the illustrated embodiment, the outer diameter of optical component 171 is slightly less-than that of inner wall surface 113 whereby the optical component can be positioned within attachment bore 112 in abutting engagement with first plate flange 116. Locking member 174 may be used to releasably secure optical component 171 firmly against first plate flange 116. Alternatively, in the event that the outer perimeter of the optical component is provided with threads, the optical component may be threaded into attachment bore 112. Such configurations allow the optical component to be repeatably removed from and/or installed on base 101 with great ease and precision.

Preferably, attachment bore 112 of the first plate 110 and a component bore 172 (see FIG. 8) of attachment 102 are similarly dimensioned and configured thus allowing both bores 112 and 172 to receive optical component 171 and other similarly dimensioned components. In one embodiment component bore 172 is threaded in the same manner as attachment bore 112 whereby locking member 174 may also be used to secure optical component 171 within component bore 172. Such configuration reduces the number of different parts necessary thus providing a less expensive and simpler design.

Advantageously, the present innovations helps prevent fatigue of the second plate flange 126 by limiting potential movement of the flange 126. Further, the present invention supports the second plate flange 126 movement in the same direction as the first spring force $F_{S1}$, to eliminate and/or minimize potential thread movement. Consequently, the present invention can prevent unnecessary damage and breakage of the base 101. Further, the present innovation also provides an attachment bore for receiving an attachment 102.

The optical mount of the present invention provides a secure locking system for fitted opto-mechanical components and optical components, and secure locking of adjustable elements. Furthermore, the optical mount of the present invention also promotes repeatability in positioning and/or orientation as the optical and opto-mechanical components are removed from and secured within an optical system.

Advantageously, the present invention also provides an optical mount having fewer parts than prior configurations thereby providing a design that is less costly to manufacture and is less prone to breakage. Furthermore, the configuration of the present invention provides an optical mount in which promotes continuous thread-to-thread contact of the adjustment screw and the second or base plate.

Figure 10:
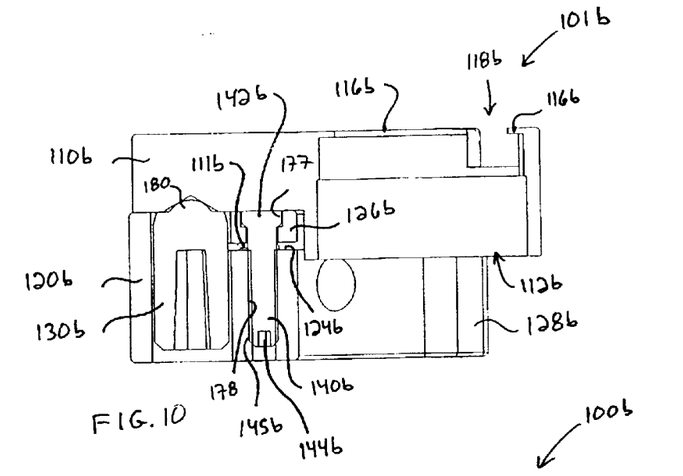
FIG. 10 is a cross-sectional view, similar to FIG. 3, of a modified optical mount in accordance with the present invention.

In another embodiment shown in FIG. 10, optical mount 100b includes a modified base 101b that is similar to base 101 described above but has several modified components. Like reference numerals have been used to describe like components of optical mount 100 and optical mount 100b.

In this embodiment, a modified adjustment screw 130b is utilized. In contrast to adjustment screw 130 described above, adjustment screw 130b includes an integral rounded tip 180. Tip 180 is monolithically formed with adjustment screw 130b. For example, the adjustment screw may be cast in a shape that includes a semispherical tip.

Alternatively, adjustment screw 130b may be machined in order to form the semispherical tip. One should appreciate that other suitable means to form the adjustment screw can be utilized.

Advantageously, the configuration of tip 180 eliminates play between the upper tip 180 and the lower body of adjustment screw 130b thus providing greater precision and fine-tuning in adjusting an optical component mounted on mount 100b. Furthermore, the configuration of adjustment screw 130b includes fewer parts whereby fabrication costs are decreased and wear is minimized.

Locking screw 140b includes a head 142b and a tip 144b. The second plate flange 126b includes a locking flange bore 177. Tip 144b is configured to pass through locking flange bore 177, pass across the slit 124b, and engage the second plate body 128b. The head 142b is configured to engage the second plate flange 126b. The locking bore 146b includes a locking base thread 178 and the tip 144b includes a locking screw thread 145b to mate with the locking base thread 178 for adjusting the relative position of the second plate body 128b and the second plate flange 126b. The locking bore 146b allows for the insertion of a tool (not shown) to rotate the locking screw 140b. Again one should appreciate that other suitable means may be utilized for adjusting the relative position of the second plate body 128b and the second plate flange 126b.

Figure 11:
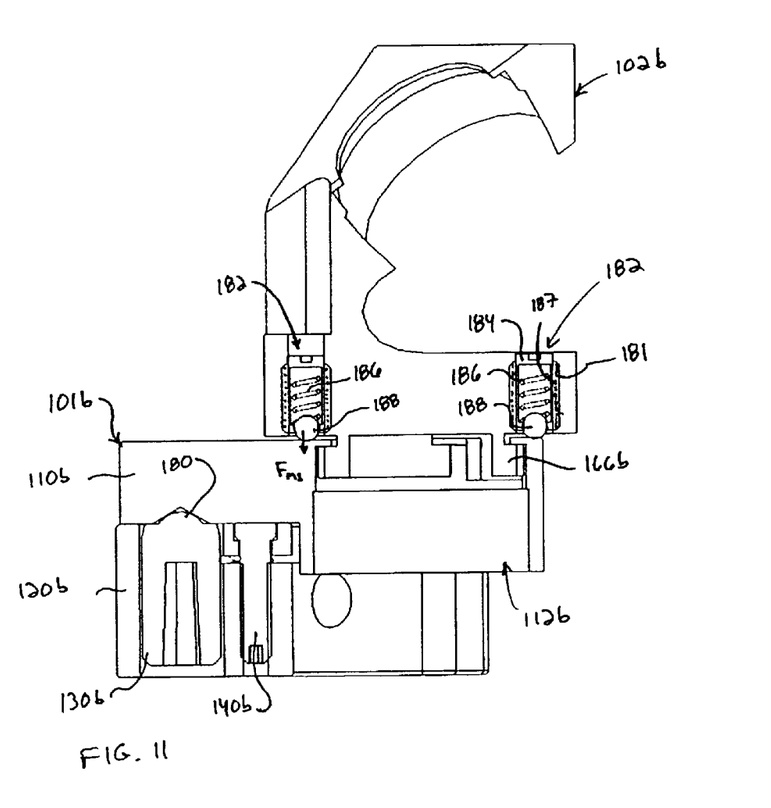
FIG. 11 is a cross-sectional view of the optical mount of FIG. 10 having a modified attachment.

As shown in FIG. 11, an alternate attachment locking system 170b is shown in combination with base 101b. The attachment locking system 170b may include one or more pressure members 188 coupled with the attachment 102b for biasing the attachment flange 166b toward the first plate flange 116b to frictionally secure the attachment flange 166b to the first plate flange 116b thereby locking the attachment 102b to the first plate 111b. One should appreciate that other suitable means may be utilized for biasing the attachment flange toward the first plate flange to frictionally secure the attachment flange to the first plate flange.

The screw housing 184 is configured for adjusting the pressure exerted by the pressure member 188 against the first plate top surface 190. The screw housing 184 may extend through the contact bore 182 and engage the first plate top surface 190 for securing the attachment flange 166b to the first plate flange 116b. The screw thread 181 mates with the contact bore thread 187. Rotation of the screw housing 184 in one direction biases the pressure member 188 toward the first plate top surface 190b and increases the member force $F_{M1}$ exerted by the pressure member 188 against the first plate top surface 190b. Rotation of the screw housing 184 in an opposite direction reduces the member force $F_{M1}$, exerted by the pressure member 188 against the first plate top surface 190b.

The attachment locking system 170b may include a contact bore 182 that is configured for housing the pressure member 188, and a contact spring 186 for biasing the pressure member 188 against the first plate top surface 190b. The attachment locking system 170 optionally includes a contact bore thread 187 coupled with the contact bore 182, a contact screw housing 184 having a screw thread 181 mating with the contact bore thread 187. The contact screw housing 184 is coupled with the contact spring 186.

Attachment 102b may be releaseably secured to the base 101b by exerting a pressure on the attachment flange 166b against the first plate flange 116b for frictionally securing the attachment flange 166b to the first plate flange 116b. Pressure member 188 is configured to contact the first plate top surface 190b in proximity to the attachment bore 112b. One should appreciate that pressure member 188 may contact the base 101b in a variety of other locations for securing the attachment flange 166b against the first plate flange 116b.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An optical mount, comprising:
   a first plate;
   a second plate including an adjustment bore having an adjustment bore thread, and a slit that separates a second plate flange from a second plate body and extends proximal said adjustment bore;
   an adjustment screw having an adjustment screw thread, said adjustment screw extending through said adjustment bore and engaging said first plate for adjusting relative position of said first plate in relation to said second plate, said adjustment screw thread mating with said adjustment bore thread; and
   a locking screw engaging said second plate flange and said second plate body, said locking screw configured for biasing said second plate flange toward said second plate body to press at least a portion of said adjustment bore thread into said adjustment screw thread for frictionally securing said adjustment screw.

2. The mount as recited in claim 1, wherein said slit extends at least 180° about a longitudinal axis of said adjustment bore.

3. The mount as recited in claim 1, further comprising a spring engaging said first plate and said second plate, said spring configured for biasing said first plate toward said second plate.

4. The mount as recited in claim 3, wherein biasing second plate flange toward said second plate body effects a first locking force $F_{L1}$ on said adjustment screw thread against said adjustment bore thread that is in the same direction as a spring force $F_{S1}$, effected by said spring on said adjustment screw thread against said adjustment bore thread.

5. The mount as recited in claim 1, further comprising a locking bore extending through said second plate body, said locking screw includes a head and a tip, said tip configured for passing through said locking bore, passing across said slit, and engaging said second plate flange, said head configured for engaging said second plate body.

6. The mount as recited in claim 5, further comprising a flange bore having a locking flange thread, said tip further having a locking screw thread mating with said locking flange thread for adjusting the relative position of said second plate body and said second plate flange.

7. The mount as recited in claim 1, further comprising a flange bore extending through said second plate flange, said locking screw includes a head and a tip, said tip configured for passing through said flange bore, passing across said slit, and engaging said second plate body, said head configured for engaging ,said second plate flange.

8. The mount as recited in claim 1, farther comprising:
   an attachment bore through the first plate having an attachment bore axis;
   a first plate flange extending inward toward said attachment bore axis;
   a channel through said first plate flange and a portion of said first plate;
   an attachment having a protrusion with a protrusion axis, said protrusion including an attachment flange extending outward away from said protrusion axis, said protrusion configured for slidably inserting through said channel and into said attachment bore;
   said protrusion configured for rotatably coupling said attachment flange and said first plate flange; and
   an attachment locking system configured for releaseably coupling said attachment and said first plate.

9. An optical mount comprising:
   a first plate including an attachment bore through the first plate having an attachment bore axis, a first plate flange extending inward toward said attachment bore axis, and a channel through said first plate flange and a portion of said first plate;
   an attachment having a protrusion with a protrusion axis, said protrusion including an attachment flange extending outward away from said protrusion axis, said protrusion configured for slidably inserting through said channel and into said attachment bore, said protrusion configured for rotatably coupling said attachment flange and said first plate flange; and
   an attachment locking system configured for releaseably coupling said attachment and said first plate.

10. The mount as recited in claim 9, wherein said attachment locking system includes:
said attachment bore, said attachment bore comprising an attachment bore thread, an attachment locking member having a locking member thread mating with said attachment bore thread, said attachment locking member configured for pushing said attachment flange toward said first plate flange for frictionally securing said attachment flange to said first plate flange thereby locking said attachment to said first plate.

11. The mount as recited in claim 9, wherein said attachment locking system includes a pressure member coupled with said attachment and configured for biasing said attachment flange toward said first plate flange for frictionally securing said attachment flange to said first plate-flange thereby locking said attachment to said first plate.

12. The mount as recited in claim 11, wherein said first plate includes a first plate top surface, wherein said attachment locking system further includes a contact bore configured for housing said pressure member, and a contact spring biasing said pressure member against said first plate top surface.

13. The mount as recited in claim 12, wherein said attachment locking system further includes a contact bore thread coupled with said contact bore, a contact screw housing having a screw thread mating with said contact bore thread, said contact screw housing coupled with said contact spring.

14. The mount as recited in claim 13, wherein said screw housing is configured for adjusting the pressure said pressure member exerts against said first plate top surface.

15. The mount as recited in claim 11, wherein said pressure member is configured to contact the first plate top surface in proximity to said attachment bore.

16. The mount as recited in claim 9, said mount further comprising a plurality of protrusions and a plurality of channels wherein each said protrusion is configured for slidably insertion through a respective channel.

17. The mount as recited in claim 9, said mount comprising two channels through said first plate flange and a portion of said first plate, wherein said attachment includes two opposing protrusions slidably insertable into said two channels, respectively.

18. The mount as recited in claim 9, wherein said first plate has an inner wall surface defining said attachment bore for receiving the attachment flange.

19. The mount as recited in claim 9, wherein said first plate flange has a first inner radius $R_1$, said attachment groove has a second outer radius $R_2$, and said attachment flange has a third radius $R_3$, wherein the first radius $R_1$ is greater than the second radius $R_2$ and the third radius $R_3$ is greater than the first radius $R_1$.

20. The mount as recited in claim 9, said mount further comprising:
a second plate having an adjustment bore having an adjustment bore thread, and a slit that separates a second plate flange from a second plate body and extends into said adjustment bore;
an adjustment screw having an adjustment screw thread, said adjustment screw extending through said adjustment bore and engaging said first plate for adjusting relative position of said first plate in relation to said second plate, said adjustment screw thread mating with said adjustment bore thread; and
a locking screw engaging said second plate flange and said second plate body, said locking screw configured for biasing said second plate flange toward said second plate body to press at least a portion of said adjustment bore thread into said adjustment screw thread for frictionally securing said adjustment screw.

21. A method of securing an attachment to a mount comprising:
providing a first plate including an attachment bore having a longitudinal axis, a first plate flange extending from said wall toward said longitudinal bore axis, and a channel extending through and below said first plate flange into said attachment bore;
providing an attachment including a protrusion and an attachment flange extending from said protrusion away from a longitudinal axis of said attachment;
slidably engaging said attachment to said first plate by inserting said protrusion through said channel and into said attachment bore of said first plate, such that said slidably engaging is accomplished by moving said protrusion through said channel in a direction that is non-parallel to said longitudinal bore axis resulting in coincident alignment of said longitudinal bore axis and said longitudinal attachment axis;
releaseably securing said attachment and said first plate with an attachment locking system.

22. The method as recited in claim 21 further comprising rotating said attachment with respect to said first plate about the coincidentally aligned longitudinal axes thereby moving said protrusion out of alignment with said channel.

23. The method as recited in claim 21, wherein said slidably engaging is accomplished by moving said protrusion through said channel in a direction that is perpendicular to said longitudinal axis of said attachment bore.

24. The method as recited in claim 21, wherein said releaseably securing said attachment further includes tightening a locking screw to bias said attachment flange toward said first plate flange for frictionally securing said flanges.

25. The method as recited in claim 21, wherein said releaseably securing said attachment further includes exerting a pressure on said attachment flange against said first plate flange for frictionally securing said attachment flange to said first plate flange.

26. The method as recited in claim 21 further comprising removing said attachment from said first plate, inserting an optical component into said attachment bore, and releasably securing said optical component to said first plate with said attachment locking system.

27. The method of using an optical mount comprising:
providing a first plate configured for supporting an optical component, a second plate including a threaded adjustment bore and a slit extending into said adjustment bore, and slit separating a second plate flange from a second plate body, an adjustment screw extending through said threaded adjustment bore and engaging said first plate, said adjustment screw having a threaded portion mating with said threaded adjustment bore;
adjusting the relative position of said first plate in relation to said second plate using said adjustment screw; and
locking said adjustment screw with respect to said second plate using a locking screw, said locking screw engaging said second plate flange and said second plate body and being configured for pulling said second plate flange toward said second plate body to press at least a portion of said threaded bore into said threaded portion of said adjustment screw thereby frictionally securing said adjustment screw.

* * * * *